(12) United States Patent
VanderWeide

(10) Patent No.: US 10,962,030 B1
(45) Date of Patent: Mar. 30, 2021

(54) PNEUMATIC CYLINDER

(71) Applicant: DADCO, Inc., Plymouth, MI (US)

(72) Inventor: Karen M. VanderWeide, Livonia, MI (US)

(73) Assignee: DADCO, Inc., Plymouth, MI (US)

( * ) Notice: Subject to any disclaimer, the term of this patent is extended or adjusted under 35 U.S.C. 154(b) by 0 days.

(21) Appl. No.: 17/111,473

(22) Filed: Dec. 3, 2020

Related U.S. Application Data

(60) Provisional application No. 62/943,898, filed on Dec. 5, 2019, provisional application No. 62/990,371, filed on Mar. 16, 2020.

(51) Int. Cl.
| | | |
|---|---|---|
| *F15B 11/12* | (2006.01) | |
| *F16J 10/02* | (2006.01) | |
| *F15B 15/22* | (2006.01) | |
| *F15B 15/14* | (2006.01) | |

(52) U.S. Cl.
CPC ........ *F15B 11/121* (2013.01); *F15B 15/1409* (2013.01); *F15B 15/223* (2013.01); *F16J 10/02* (2013.01)

(58) Field of Classification Search
CPC ....... F15B 11/12; F15B 11/121; F15B 11/122; F15B 11/123; F15B 11/126; F15B 11/127; F15B 15/1404; F15B 15/1409
See application file for complete search history.

(56) References Cited

U.S. PATENT DOCUMENTS

| 3,792,642 | A | * | 2/1974 | Arai | F15B 11/121 |
| | | | | | 91/51 |
| 5,189,942 | A | * | 3/1993 | Ohkubo | F15B 11/122 |
| | | | | | 74/335 |
| 5,226,346 | A | * | 7/1993 | Wagner | F15B 11/121 |
| | | | | | 91/408 |
| 6,408,740 | B1 | * | 6/2002 | Holt | F15B 11/123 |
| | | | | | 91/173 |
| 7,214,902 | B2 | * | 5/2007 | Vanderzwet | B23K 11/314 |
| | | | | | 219/89 |
| 7,714,247 | B2 | * | 5/2010 | Tenzer | F15B 11/121 |
| | | | | | 219/89 |
| 7,718,916 | B2 | * | 5/2010 | Tenzer | F15B 11/121 |
| | | | | | 219/89 |
| 2003/0089684 | A1 | * | 5/2003 | Beauregard | B23K 11/314 |
| | | | | | 219/89 |

* cited by examiner

*Primary Examiner* — Michael Leslie
(74) *Attorney, Agent, or Firm* — Reising Ethington P.C.

(57) ABSTRACT

A pneumatic cylinder with a piston rod movable to fully extended, intermediate and fully retracted positions. The cylinder may have a first head engaging one end of a first tube with a first piston slidably received therein, an intermediate connector engaging the other end of the first tube and one end of a second tube with a second piston slidably received therein, and a second head engaging the other end of the second tube. The piston rod may be attached to the second piston for movement therewith and extend through the intermediate connector, first piston, first tube, and the first head to the exterior thereof.

20 Claims, 4 Drawing Sheets

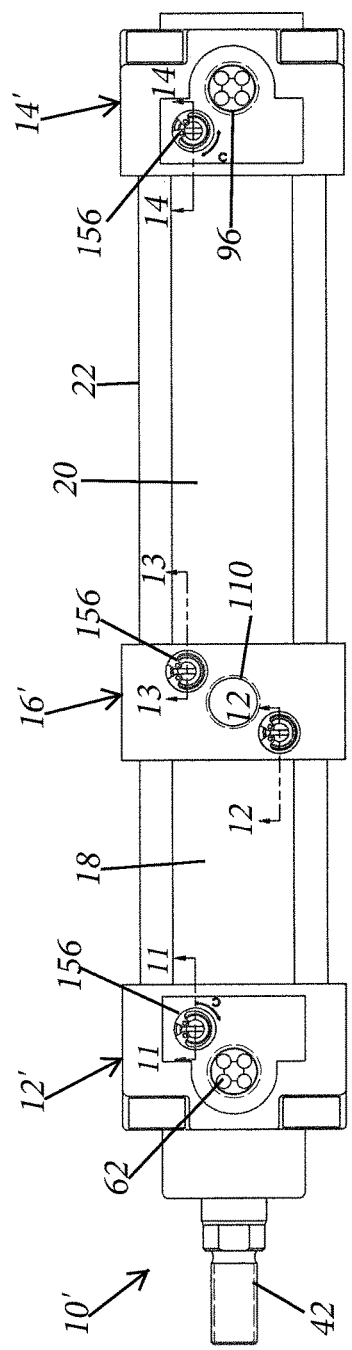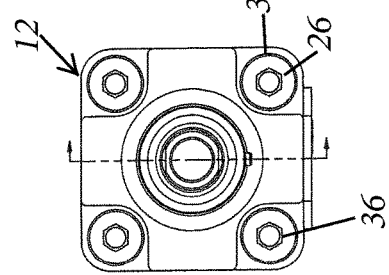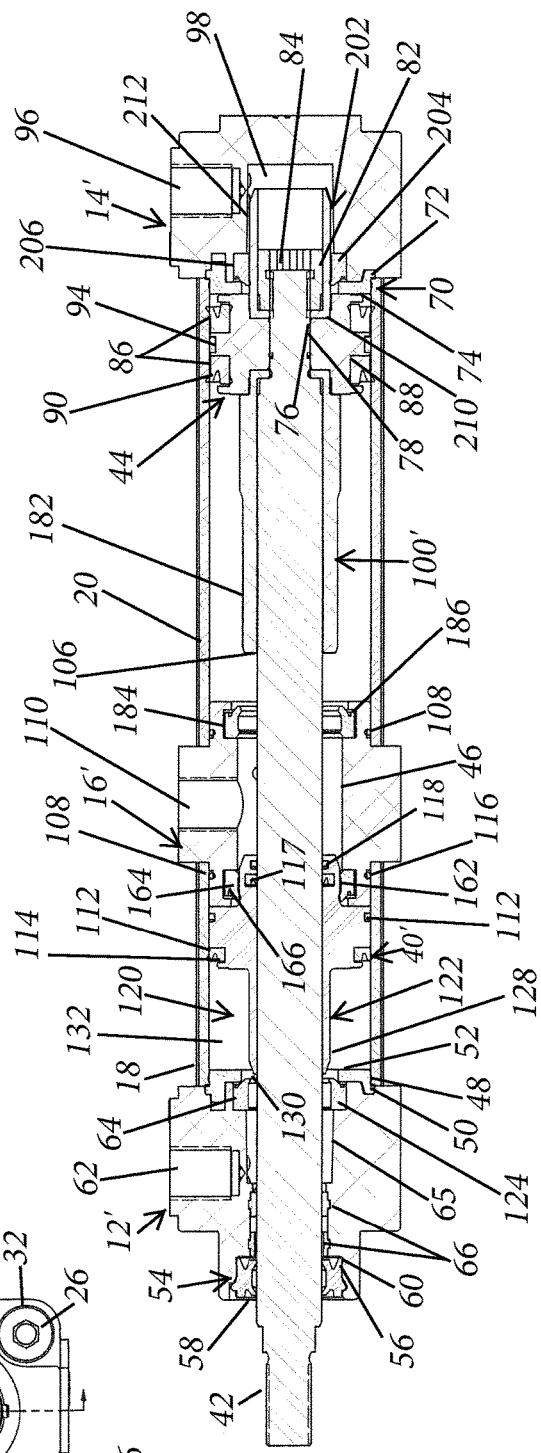

PNEUMATIC CYLINDER

CROSS-REFERENCE TO RELATED APPLICATIONS

This application claims the benefit of U.S. Provisional Application No. 62/943,898 filed Dec. 5, 2019 and U.S. Provisional Application No. 62/990,371 filed Mar. 16, 2020, both of which are incorporated herein by reference in their entireties.

TECHNICAL FIELD

This invention relates generally to pneumatic cylinders and, more particularly, to a pneumatic cylinder with at least three positions of its piston rod.

BACKGROUND

A three position pneumatic or air cylinder assembly in the form of two separate opposed cylinders each having a piston rod attached to a piston and providing a first position with both piston rods fully retracted, an intermediate position with one piston rod fully retracted and the other piston rod fully extended and a fully extended position with both piston rods fully extended is previously known. These back-to-back cylinders may also provide two intermediate positions if the piston rods have different stroke lengths. With these back-to-back cylinders, the cylinder casings may move relative to a fixed reference point. Another form of a three-position pneumatic cylinder is known with first and second cylinders in series and each having a piston rod attached to a piston with the first piston rod of the first cylinder extending into the casing and a tubular second piston rod of the second cylinder and engageable with the second piston. With this series arrangement, both the first and second piston rods may be in a fully retracted first position, the second tubular piston rod may be moveable to a partially extended position to provide a second intermediate stroke position, and in a third fully extended position both the first piston and rod and the second piston and rod are in their fully extended positions.

SUMMARY OF THE INVENTION

In at least some forms a pneumatic cylinder may include a first tube with opposed ends; a first head engaging one end of the first tube and having a first port communicating with the first tube; an intermediate connector engaging the other end of the first tube and having a second port communicating with the first tube; a second tube with opposed ends with one end engaging the intermediate connector and communicating with the second port of the intermediate connector; a second head engaging the other end of the second tube and having a third port communicating with the second tube; a first piston slidably received in the first tube and moveable between a retracted position adjacent to the intermediate connector and an extended position spaced from the intermediate connector and adjacent the first head; a second piston slidably received in the second tube and moveable between a fully retracted position adjacent the second head and a fully extended position adjacent the intermediate connector; a piston rod connected to the second piston for movement therewith and extending generally axially through the second tube, intermediate connector, first tube, first piston and first head to the exterior of the first head; and a pusher carried by at least one of the piston rod or the second piston or both for movement in unison with the second piston and the pusher having a portion configured to be spaced from the first piston when the second piston is in its fully retracted position, to be moved to bear on the first piston in its retracted position when the second piston has moved the piston rod to a discrete intermediate position with the second piston being between its fully retracted and fully extended positions, and moving the first piston at least toward its extended position when the second piston moves the piston rod to the fully extended position of the second piston and the piston rod.

In at least some forms the pneumatic cylinder may include one or more of a sealed chamber communicating with the first port, a sealed chamber communicating with the second port, and a sealed chamber communicating with the third port.

In at least some forms of the pneumatic cylinder the piston rod can be moved from any one of its retracted, extended or discrete intermediate positions to any other of such positions. In at least some forms the piston rod can be moved to its discrete intermediate position by applying through the first port a compressed gas at a first pressure and through the third port a compressed gas at a sufficiently lower second pressure while allowing the second port to exhaust. In at least some forms the piston rod can be moved from its intermediate position to its retracted position by applying to the second port a compressed gas while allowing the third port to exhaust. In at least some forms the piston rod can be moved from its intermediate position to its fully retracted position by applying through the first port a compressed gas at a first pressure and applying through the second port a compressed gas at a sufficiently lower pressure while allowing the third port to exhaust. In at least some forms the piston rod can be moved from its discrete intermediate position to its fully extended position by applying through the third port a compressed gas while allowing the first and second ports to exhaust. In at least some forms the piston rod can be moved from its fully retracted position to its fully extended position by applying through the third port a compressed gas while allowing the first and second ports to exhaust.

In at least some forms the pneumatic cylinder can include a cushion assembly cushioning movement of the first piston to its extended position and/or a cushion assembly cushioning movement of the first piston to its fully retracted position. At least some forms can include a cushion assembly cushioning movement of the second piston toward its intermediate position and/or a cushion assembly cushioning movement of the second piston toward its fully extended position and/or a cushioning assembly cushioning movement of the second piston toward its fully retracted position. In at least some forms the cushion assembly can include a sealed chamber and a control valve controlling the rate of flow of compressed gas from the sealed chamber.

BRIEF DESCRIPTION OF THE DRAWINGS

The following detailed description of preferred embodiments and best mode will be set forth with regard to the accompanying drawings in which:

FIG. 8 is a side view of a three position pneumatic cylinder embodying the invention with cushions of piston movement;

FIG. 9 is an end view of the cylinder of FIG. 8;

FIG. 10 is a sectional view taken on line 10-10 of FIG. 9;

DETAILED DESCRIPTION OF PREFERRED EMBODIMENTS

Figure 1:
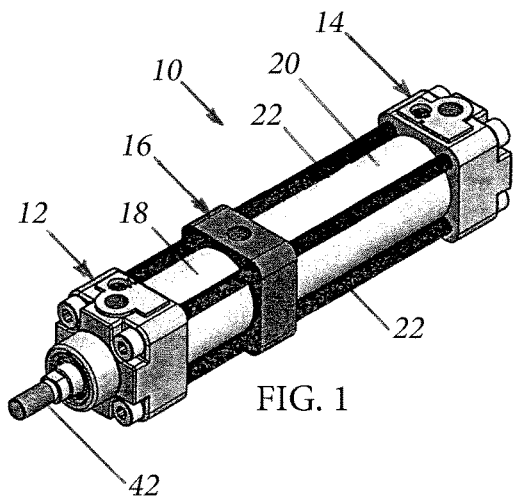
FIG. 1 is a perspective view of a three position pneumatic cylinder embodying the invention.
Figure 2:
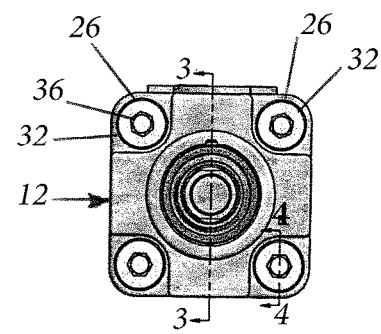
FIG. 2 is a front end view of the cylinder of FIG. 1.
Figure 4:
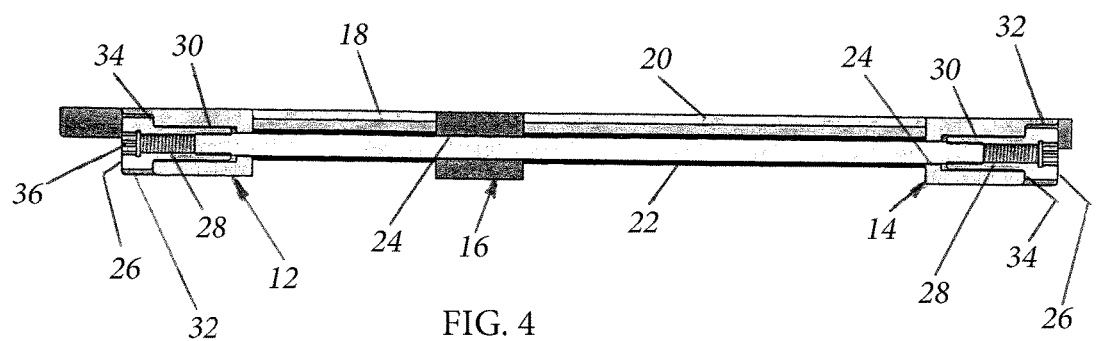
FIG. 4 is an enlarged sectional view taken on line 4-4 of FIG. 2.

Referring in more detail to the drawings, FIG. 1 illustrates a three-position pneumatic cylinder 10 with a first front head 12, a second rear head 14, an intermediate connector 16, a first cylindrical tube 18 received between and bearing on the front head and the connector, and a second cylindrical tube 20 received between and bearing on the connector and the rear head 14. All of these components may be retained in assembly by at least two and desirably four tie rods 22. As shown in FIG. 4, each tie rod extends through a bore 24 through the intermediate connector and is secured in the heads 12 & 14 and placed in tension by threaded fasteners 26 engaging complimentary threads 28 adjacent each end of each tie rod and received in counterbores 30 & 32 in an associated head and bearing on a shoulder 34 of the head. Each fastener may have a hexagonal socket 36 to facilitate rotation of the fastener to engage and disengage the complimentarily threaded portion of its associated tie rod.

Figure 3:
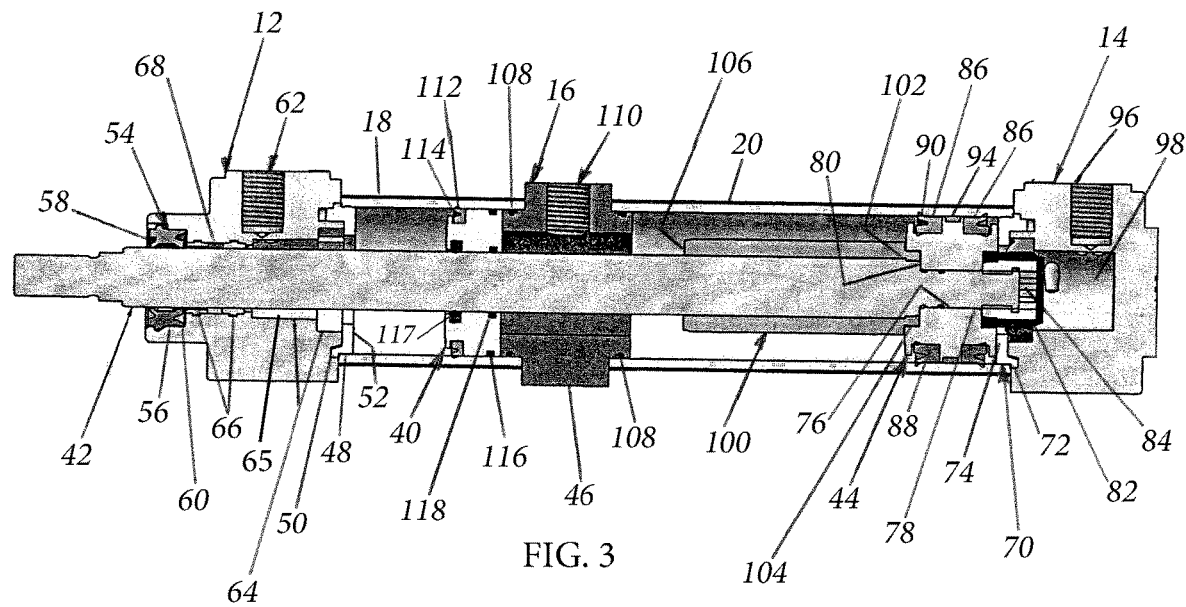
FIG. 3 is an enlarged full sectional view of the cylinder taken on line 3-3 of FIG. 2.

As shown in FIG. 3, the cylinder may have a first floating piston 40 slideably received in the first tube 18, a piston rod 42 attached adjacent one end to a second piston 44 slideably received in the second tube 20 and the rod extending through a bore 46 in the intermediate connector 16, the first piston 40 and the front head 12. The first piston and piston rod are relatively moveable to each other.

A seal may be provided between the first cylindrical tube 18 and the front head 12 by an annular circumferentially continuous seal 48 received in a groove 50 in the front head and engaging both this tube and the front head. This seal may have an annular radially extending portion 52 overlapping an adjacent face of the first piston 40 to provide a cushion when the first piston is moved to its extended position shown in FIG. 7 adjacent the front head. A seal between the piston rod and the front head may be provided by a circumferentially continuous seal 54 received in a counterbore 56 in an end of this head. Desirably, this seal may have generally axially spaced part lips 58 & 60 engaging the piston rod and the front head. The front head may have a first port 62 communicating with the interior of the first tube 18 and an adjacent face of the first piston 40 through counterbores 64 & 65 in the front head opening into the first tube. Desirably, at least one, and preferably two, bearings 66 in the form of split annular rings may encircle the piston rod 42 and be received in a bore 68 in the front head.

Figure 5:
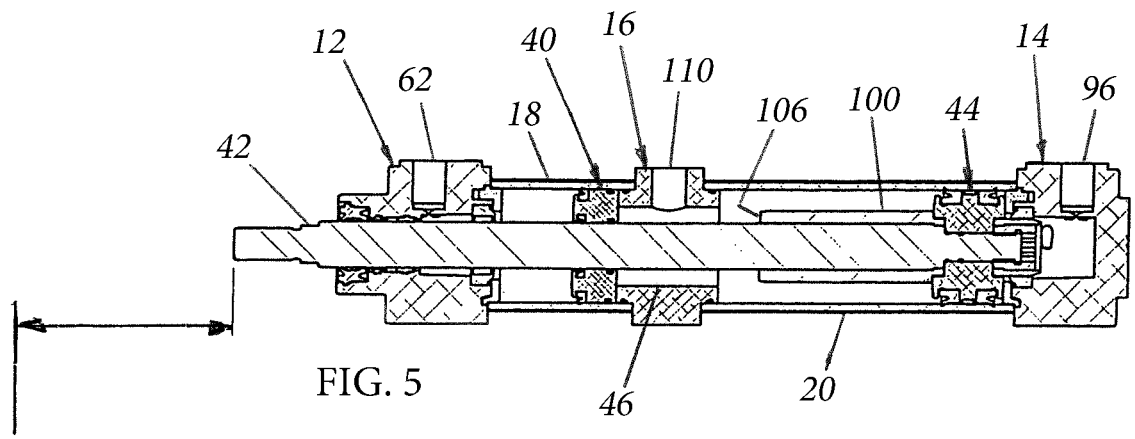
FIG. 5 is a somewhat schematic sectional view of the cylinder with its piston rod in its fully retracted position.

A seal may be provided between the rear head 14 and the second tube 20 by an annular seal ring 70 received in a groove 72 and may include an annular portion 74 extending radially inward of the tube which may provide a cushion for the second piston 44 when it returns to its fully retracted position shown in FIGS. 3 and 5.

The second piston 44 may have a center bore 76 received on a reduced diameter portion 78 of the piston rod, bearing on a shoulder 80 and secured to the piston rod by a fastener 82 threadably engaging the piston rod 42 and bearing on the piston. The fastener 82 may have a hexagonal socket 84 to facilitate attachment of the fastener to the piston rod. The second piston may have two circumferentially continuous seals 86 each received in a groove 88 in the piston and engaging the piston and the second tube to provide a seal between them. Each seal may have two annular lips 90 with a groove between them with one lip engaging the piston and the other lip engaging the second tube to provide a seal between them. These two seals 86 may face in generally axially opposed directions to collectively thereby provide a gas tight seal between the piston and the tube regardless of which side of the piston is subjected to a pressurized gas such as air. An annular split ring bearing 94 may be received in a circumferentially continuous groove in the second piston between the seals 86 and slideably engaging the inner cylindrical surface of the second tube. The rear head may have a third port 96 communicating with a blind passage 98 opening into one end of the second tube. The passage 98 may be coaxial with the piston rod 42 and of sufficient diameter to provide clearance around the fastener 82 when the second piston 44 is in its fully retracted position adjacent the rear head.

Figure 6:
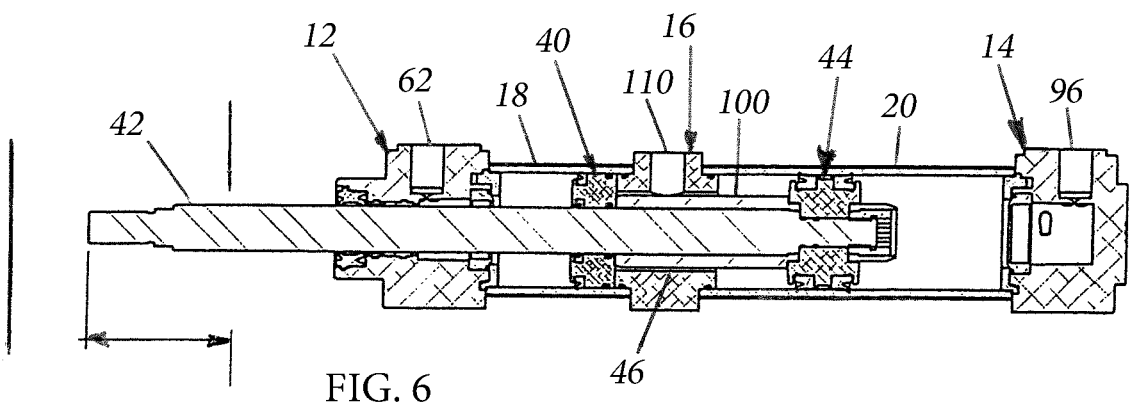
FIG. 6 is a somewhat schematic sectional view of the cylinder with its piston rod in a discrete intermediate position.
Figure 7:
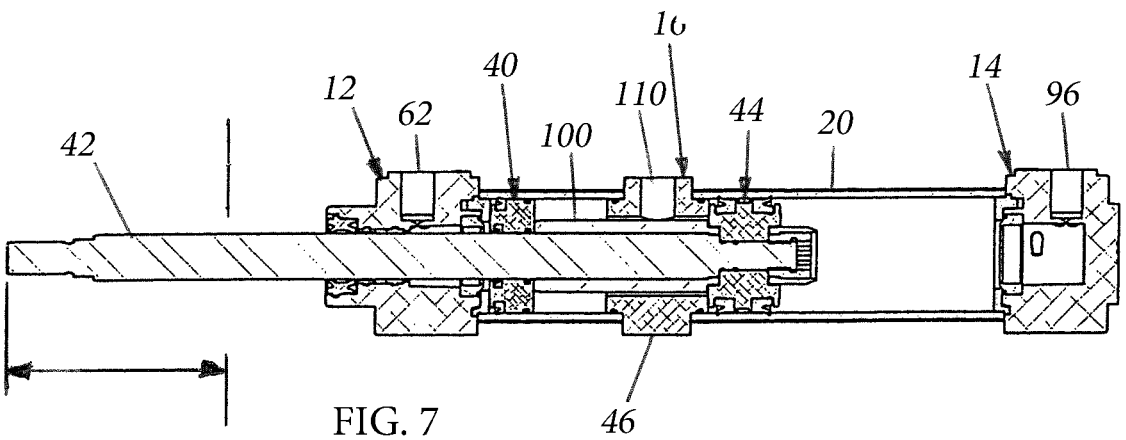
FIG. 7 is somewhat schematic sectional view of the cylinder with its piston rod in its fully extended position.

A sleeve 100 may be slideably received over the piston rod 42 and adjacent one end be entrapped and secured between a shoulder 102 of the piston rod and an annular recess 104 in the second piston. The sleeve may be configured to extend through the bore 46 of the intermediate connector 16 with clearance between them and with its free end 106 engageable with an adjacent face of the first piston 40 when the piston rod is in its intermediate and fully extended positions as shown in FIGS. 6 and 7. If desired, the sleeve may be a homogeneously integral portion of the piston or piston rod rather than a separate sleeve received over the rod.

The intermediate connector 16 may be sealed to adjacent portions of the first and second tubes by O-rings 108 received in circumferentially continuous grooves in the intermediate connector and respectively engaging the first and second tubes and this connector. This connector may have a second port 110 communicating through its bore 46 with the first and second cylindrical tubes 18 & 20. To provide a seal between the floating first piston and the first cylindrical tube, a circumferentially continuous seal 112 may be received in an annular groove in this piston and may have two annular lips 114 with one lip bearing on this piston and the other lip bearing on the inner cylindrical surface of the first tube. If desired, another seal may be provided between the first tube and this floating piston such as by an O-ring 116 received in a circumferentially continuous groove in the outer periphery of the piston. A seal between the floating first piston and the piston rod may be provided by a circumferentially continuous seal 117 received in an annular groove in this piston and may have two annular lips with one lip bearing on this piston and the other lip bearing on the piston rod. A suitable seal may also be provided between the piston rod and this piston such as by an O-ring 118 or the like received in a circumferentially continuous groove in the piston and opening radially inward onto the piston rod.

In some applications, the floating piston may be made of a plastic material such as nylon. In other applications, this piston may be made of metal such as steel and may have split bearings received in grooves in its outside and inside diameters.

In use of the cylinder, the piston rod 42 may be moved from its fully retracted position shown in FIG. 5 to its fully extended position shown in FIG. 7 by applying a compressed gas which is typically compressed air to the port 96 of the rear head while allowing the ports 110 & 62 of the intermediate connector 16 and front head 12 to exhaust to move the second piston 44 and the piston rod 42 to their fully extended position. As they move toward the fully extended position, the free end 106 of the sleeve 100 passes through the center connector 16 and bears on the front piston 40 to move this piston from its retracted position to its extended position immediately adjacent the front head 12 and desirably bearing on the cushion portion 52 of the seal 48. From the fully extended position, shown in FIG. 7, the piston rod may be moved to a discrete intermediate position shown in FIG. 6 by applying a compressed gas to the first port 62 at a sufficiently higher pressure than that of the compressed gas in the second tube (which would be supplied through third port 96) to move the first piston 40 into engagement with the intermediate connector 16 and bear on the sleeve 100 to move the piston rod 40, sleeve and second piston 44 to the discrete intermediate position shown in FIG. 6 while allowing the port 110 in the intermediate connector 16 to exhaust. The pressure of compressed gas in the second tube and typically at the third port 96 in the rear head may be maintained to ensure that the second piston and thus the piston rod does not retract further from the discrete intermediate position shown in FIG. 6 in which the pusher sleeve 100 continues to bear on the front piston 40. From this discrete intermediate position, the second piston 44 and thus the piston rod 42 may be returned to their fully retracted position shown in FIG. 5 by applying a compressed gas through the second port 110 of the connector to the second piston 44 while allowing the third rear port 96 to exhaust. During this further retraction of the piston rod and second piston to their fully retracted position, the first port 62 may continue to be pressurized to maintain the first piston 40 in its retracted position bearing on the intermediate connector. Skilled persons will appreciate that, if desired, the piston rod and second piston may be returned from the intermediate position to their fully retracted position without maintaining pressure on the first port 62 and this would result in the first piston 40 moving to its fully extended position.

If desired, the piston rod 42 and second piston 44 may be moved from their fully retracted position shown in FIG. 5 directly to their discrete intermediate position shown in FIG. 6 (without being first moved to the fully extended position) by sequentially first applying compressed gas to the first port 62 of the first head 12 to maintain the floating first piston 40 in its retracted position in engagement with the intermediate connector 16 and then applying compressed gas at a lower pressure to the third port 96 of the rear head 14 while allowing the second port 110 of the intermediate connector to exhaust, without disengaging the first piston 40 from the connector. While in this discrete intermediate position, compressed gas at a higher pressure will be maintained through the first port 62 and acting on the first piston 40 to maintain it in engagement with the second intermediate connector while compressed gas at a lower pressure from the third port 96 acts on the second piston 44 to maintain the free end 106 of the pusher sleeve 100 in engagement with the first piston. From this intermediate position, the piston rod 42 and second piston may be moved to their fully extended position by allowing the first port 62 to exhaust while continuing to allow the second port 110 of the intermediate connector to exhaust.

FIGS. 8-14 illustrate a pneumatic three position cylinder 10' which adds cushioning of the stroke of the pistons to the cylinder 10. Therefore, the components of the cylinder 10' which are the same or substantially the same as those of the cylinder 10 will be designated by the same reference number or the same reference number with a prime (') and the description of these components will not be repeated.

Figure 11:
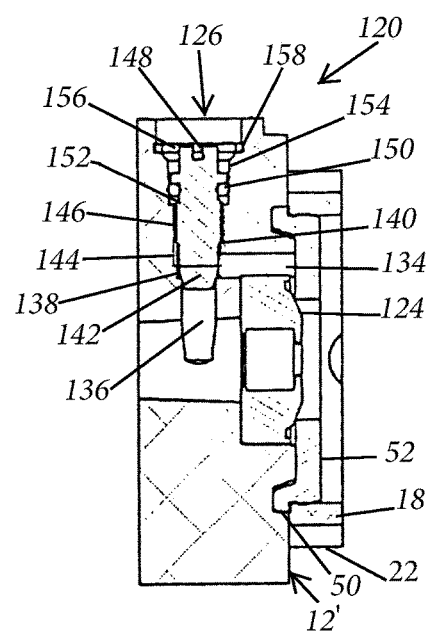
FIG. 11 is a fragmentary enlarged sectional view taken on line 11-11 of FIG. 8.

If desired, movement of the first piston 40' to its fully extended position may be cushioned by a cushion assembly 120. As shown in FIGS. 10 and 11 this cushion assembly may have a tubular sleeve 122 attached to or integral with the piston 40' for movement therewith, a seal 124 received in the recess 64 in the first head 12' and an adjustable flow rate control valve assembly 126 which controls the rate of flow of compressed gas such as air to the port 62 at least when the piston 40' approaches its fully extended position. The sleeve 122 may slideably receive the piston rod 42 and may have an exterior cylindrical continuous surface portion 128 which may engage the seal as the first piston is advanced toward its fully extended position. The free end 130 of the sleeve may be axially spaced from the seal 124 when the piston 40' is in its fully retracted position and may be chamfered to facilitate entry of the sleeve into the seal. During at least part of the movement of the piston 40' to its extended position, the sleeve surface 128 engages the seal to provide an air tight seal between them, to provide a chamber 132 between the piston 40' and the front head 12' from which compressed air may flow to the port 62 only through the control valve assembly 126 to cushion movement of the piston 40' to its fully extended position. This valve assembly 126 may have an inlet passage 134 communicating with this chamber, an outlet passage 136 communicating with the port 62, and a valve seat 138 in the first head 12'. This valve assembly may have a valve stem 140 with a valve head or tip 142 adjacent one end engageable with the seat 138 and be received in a bore 144 in the head 12' with a threaded portion 146 engageable with complementary threads on the stem to retract and advance the valve head relative to the seat by rotation of the stem. At the other end the stem may have a non-circular recess such as a slot 148 configured to receive a tool such as a screwdriver for manually rotating the stem. A seal such as an o-ring 150 may be received in a groove 152 in the stem and engage a counterbore 154 to provide an airtight seal between the stem and the first head 12'. To inhibit unintended removal of the stem from the first head, a snap ring 156 may be received in a groove 158 in the first head 12' and overlap an adjacent portion of the stem.

Figure 12:
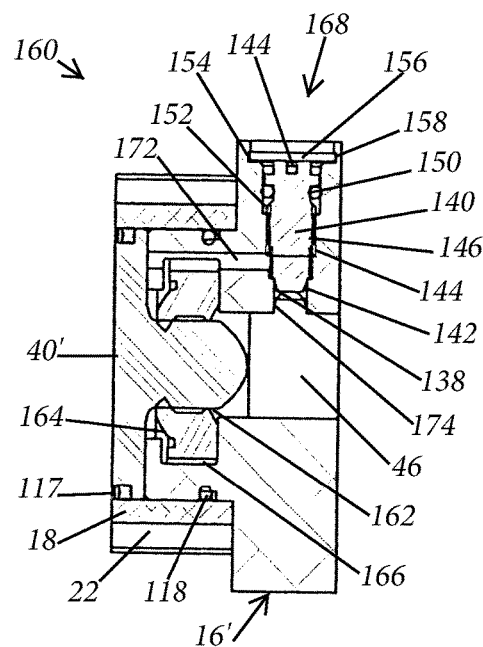
FIG. 12 is a fragmentary enlarged sectional view taken on line 12-12 of FIG. 8.

If desired, the return stroke of the floating piston 40' may be cushioned by a cushion assembly 160. As shown in FIGS. 10 and 12, this cushion assembly 160 may have a sleeve 162 attached to or preferably integral with the piston 40' for movement therewith, a seal 164 received in a groove 166 in the intermediate connector 16' and a flow rate control valve assembly 168. During at least part of a return stroke of the piston 40', the sleeve engages the seal 164 to provide an air tight seal between them to provide a chamber between the piston 40' and the intermediate connector 16' which may communicate with the port 110 only through the flow rate control valve assembly 168. This valve assembly may have an inlet passage 172 communicating with this chamber, an outlet passage 174 communicating with the port 110 through the bore 46, and a seat 138 in the intermediate connector. The valve stem 140 and seat 138 may have the same construction, arrangement and function as that of the first flow rate control valve assembly 126 and thus its description is incorporated herein by reference and will not be repeated.

Figure 13:
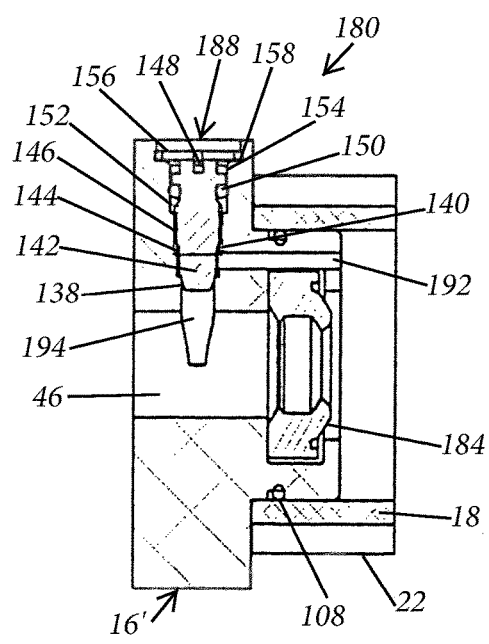
FIG. 13 is a fragmentary enlarged sectional view taken on line 13-13 of FIG. 8.

If desired, as the second piston 44 moves to its intermediate position, it may be cushioned by a cushion assembly 180. As shown in FIGS. 10 and 13, this cushion assembly may include a sleeve 100' attached to the second piston 44 with a cylindrical surface portion 182 engageable with a seal 184 received in a groove 186 in the intermediate connector 16' and a flow rate control valve assembly 188. When the cylindrical surface 182 of the sleeve 100' is advanced into sealing engagement with the seal, they may provide a chamber between the second piston 44 and the intermediate connector 16' which communicates with the second port 110 only through the flow rate control valve assembly 188. This valve assembly may have an inlet passage 192 communicating with this chamber, an outlet passage 194 communicating with the second port 110 through the bore 46, and a valve seat 138 in the intermediate connector. The adjustable flow rate control valve assembly 188 may have the same construction and arrangement as that of the control valve assembly 126, the description of which is incorporated herein by reference and will not be repeated. Desirably axially beyond both ends of the surface portion 182 the sleeve has smaller outside diameter portion so that they do not engage the seal 184 and thus, do not provide any chamber.

Figure 14:
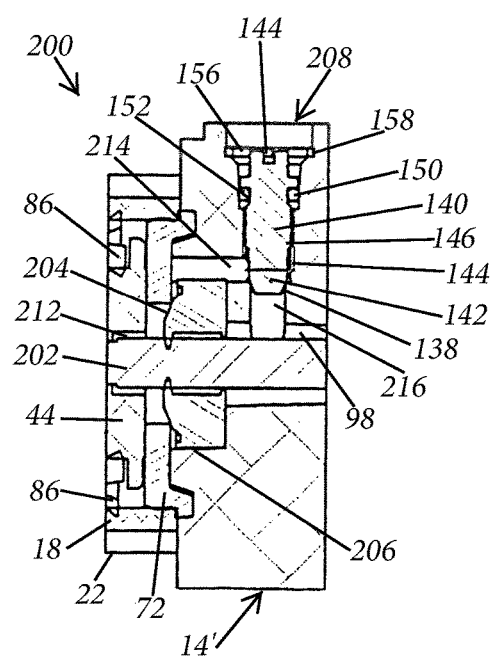
FIG. 14 is a fragmentary enlarged sectional view taken on line 14-14 of FIG. 8.

If desired, the return of the second piston 44 to its fully retracted position from either its fully extended position or intermediate position may be cushioned by a cushion assembly 200. As shown in FIGS. 10 and 14, this cushion assembly may have a tubular sleeve 202 attached to the piston for movement therewith, a seal 204 received in a recess 206 of the rear head 14', and an adjustable flow rate control valve assembly 208. The sleeve may be received in a counterbore 210 in the second piston and attached to this piston for movement therewith by a nut 82 engaged with complementary threads on the rod. This sleeve may have a tapered free end and an exterior cylindrical surface portion 212 which when in sealing engagement with the seal may provide a chamber between the second piston 44 and the rear head 14' which may communicate with the port 96 only through the adjustable flow rate control valve assembly 208. As shown in FIG. 14, this valve assembly may have an inlet passage 214 communicating with this chamber, an outlet passage 216 communicating with the port 96 and a valve seat 138 in the rear head 14'. This control valve assembly 208 may have the same construction and arrangement as the valve assembly 126 with a valve stem 140 and a seat 138 the description of which is incorporated herein by reference and will not be repeated.

The three position pneumatic cylinder 10' may operate and function in basically the same way and manner as the cylinder 10, with a fully retracted position, a fully extended position, and a discrete intermediate position of its piston rod 42 and second piston 44. Its floating piston 40' also operates and functions in basically the same way and manner as the floating piston 40 of the cylinder 10. Thus, the description of this basic operation is incorporated herein by reference and will not be repeated. The pneumatic cylinder 10' may be constructed with one, more than one, or all four of the cushion assemblies each of which may operate independently of the other cushion assemblies and the flow rate of the control valve of each assembly may be independently adjusted and set.

In operation of the first control assembly 120, as the floating piston 40' is advanced toward its fully extended position, its sleeve 122 sealingly engages the seal 124 to provide a chamber from which compressed air flows only through the control valve assembly 126 to the port 62 to cushion the piston 40' as it moves to its fully extended position. The extent to which the floating piston 40' is advanced before the cushioning begins can be changed by changing the axial length of the sleeve 122 and thus the point at which it begins to provide sealing engagement with the seal. In operation of the second cushion assembly 160 as the floating piston 40' moves from its extended position toward its fully retracted position, its sleeve 162 sealingly engages with the seal 164 to provide a chamber from which compressed air (from this chamber) flows only through the control valve assembly 168 to the port 110 as the floating piston 40' moves to its fully retracted position bearing on the intermediate connector 16'.

In operation of the third cushion assembly 180, as the second piston 44 moves from its retracted position to its discrete intermediate position, when its associated sleeve 100' moves into sealing engagement with the seal 184 they provide a chamber which communicates with the port 110 only through the adjustable flow rate control valve assembly 188. If and as the second piston advances further from its intermediate position toward its fully extended position, this cushion assembly 180 may continue to cushion this further advancing movement since the sleeve 100' continues to be in sealing engagement with the seal 184 and, if the cylinder 10' has both this second cushion assembly and the first cushion assembly 120, the first cushion assembly may also operate to further cushion the second piston 44 if the floating piston 40' is moved from its retracted position to its extended position by the second piston. In operation of the cushion assembly 200, as the second piston 44 moves toward its retracted position (from either its fully extended position or intermediate position), when its sleeve 202 sealingly engages the seal 204 they provide a chamber which communicates with the port 96 only through the flow rate control valve assembly 208 to cushion the second piston 44.

These cylinders 10 and 10' have the significant practical advantages of three discrete or definite positions of the piston rod using only the differential pressure of compressed gas without requiring or needing any position sensing of the piston rod and/or the second piston, the piston rod may be moved to a discrete intermediate position by either partially extending the main second piston from its fully retracted position or retracting the main second piston from its fully extended position, and the piston rod may be moved into a discrete intermediate position either on every cycle of the cylinder or if desired only on some cycles when desired or necessary. The piston rod can be moved from any one of its retracted, extended, or discrete intermediate positions directly to any other of such positions. These cylinders can be readily adapted to a wide range of piston rod full stroke and discrete intermediate stroke positions by simply changing the axial length of the first and second tubes, the pusher, and the piston rod to provide the desired length of the stroke of the piston rod from its fully retracted position to its fully extended position and also the length of the stroke of the piston rod from its fully retracted position to its discrete intermediate position or from its fully extended position to its discrete intermediate position. These cylinders may also be adapted to many different cylinder tube and piston diameters or sizes.

While the forms of the invention herein disclosed constitute presently preferred embodiments, many others are possible. For example, skilled persons will appreciate that the cylinder could be constructed to operate with the same pressure of compressed gas being applied to both tubes if the diameter of the first piston and first tube were made sufficiently larger than the diameter of the second piston and the second tube to produce a greater force engaging the first piston with the intermediate connector than the force of the second piston engaging its pusher sleeve with the first piston while the piston rod is in the discrete intermediate position. It is not intended herein to mention all of the possible equivalent forms or ramifications of the invention. It is understood that the terms used herein are merely descriptive, rather than limiting, and that various changes may be made without departing from the spirit or scope of the invention.

The invention claimed is:

1. A pneumatic cylinder comprising:
   a first tube with opposed ends;
   a first head engaging one end of the first tube and having a first port communicating with the first tube;
   an intermediate connector engaging the other end of the first tube and having a second port communicating with the first tube;
   a second tube with opposed ends with one end engaging the intermediate connector and communicating with the second port of the intermediate connector;
   a second head engaging the other end of the second tube and having a third port communicating with the second tube;
   a first piston slideably received in the first tube and moveable between a retracted position adjacent to or bearing on the intermediate connector and an extended position spaced from the intermediate connector and adjacent the first head;
   a second piston slideably received in the second tube and moveable between a fully retracted position adjacent the second head and a fully extended position adjacent the intermediate connector;
   a piston rod connected to the second piston for movement therewith and extending generally axially through the second tube, intermediate connector, first tube, first piston and first head to the exterior of the first head; and
   a pusher carried by at least one of the piston rod or the second piston or both for movement in unison with the second piston and the pusher having a portion configured to be spaced from the first piston when the second piston is in its fully retracted position, to be moved to bear on the first piston in its retracted position when the second piston has moved the piston rod to a discrete intermediate position with the second piston being between its fully retracted and fully extended positions, and moving the first piston at least toward its extended position when the second piston moves the piston rod to the fully extended position of the second piston and the piston rod.

2. The cylinder of claim 1 wherein at least part of the intermediate connector extends outward of the tubes and the cylinder also comprises at least two tie rods each disposed outside of the tubes, extending generally axially through an exterior portion of the intermediate connector and attached adjacent one of its ends to the first head and adjacent its other end to the second head and the tie rods retaining the first tube in engagement with the first head and the intermediate connector and the second tube in engagement with the second head and the intermediate connector.

3. The cylinder of claim 1 which also comprises a first seal providing a seal between the piston rod and the first head, a second seal carried by the first piston and providing a seal between an interior portion of the first tube and the first piston, and a third seal carried by the first piston and providing a seal between the first piston and the piston rod, and the seals providing a first sealed chamber communicating with the first port and including at least a portion of the interior of the first tube between the first piston and the first head.

4. The cylinder of claim 1 which also comprises at least one seal carried by the second piston and providing a seal between the second piston and the interior of the second tube and the seal providing a sealed chamber communicating with the third port and including at least a portion of the interior of the second tube between the second piston and the second head.

5. The cylinder of claim 1 which also comprises a seal carried by the second piston and providing a seal between the second piston and an interior portion of the second tube to provide a sealed chamber communicating with the second port and including at least a portion of the interior of the second tube between the second piston and the intermediate connector.

6. The cylinder of claim 1 wherein the piston rod can be moved to a discrete intermediate position between its fully retracted and fully extended positions by applying through the first port to the first piston a compressed gas at a first pressure and applying to the second piston through the third port a compressed gas at a second pressure which is sufficiently lower than the first pressure so that the pusher does not move the first piston from its retracted position while allowing the second port to exhaust.

7. The cylinder of claim 1 wherein the piston rod can be moved from a discrete intermediate position to its fully retracted position while maintaining the first piston in its retracted position by applying a compressed gas through the first port to the first piston at a first pressure and applying a compressed gas through the second port to the second piston at a second pressure which is sufficiently less than the first pressure to prevent the first piston from being moved from its fully retracted position while allowing the third port to exhaust.

8. The cylinder of claim 1 wherein the piston rod can be moved from a discrete intermediate position to its fully extended position by applying compressed gas through the third port to the second piston and allowing the first and second ports to exhaust so that the pusher moves the first piston away from its retracted position.

9. The cylinder of claim 1 wherein the piston rod can be moved from its fully retracted position to its fully extended position by applying a compressed gas to the second piston through the third port while allowing the first and second ports to exhaust.

10. The cylinder of claim 1 wherein the pusher comprises a sleeve carried by the piston rod or the second piston or both for movement therewith and the sleeve having an end spaced from the second piston and configured to bear on the first piston without moving it from its retracted position when the piston rod is in its discrete intermediate position and to move the first piston away from the intermediate connector and toward its extended position when the second piston moves the piston rod to its fully extended position.

11. The cylinder of claim 10 wherein the sleeve is a homogeneously integral part of the piston or piston rod.

12. The cylinder of claim 1 wherein the piston rod is a solid cylindrical rod.

13. The cylinder of claim 1 wherein each of the heads and the intermediate connector have portions outboard of the tubes and also comprising at least four tie rods circumferentially spaced apart and each extending axially through the intermediate connector and adjacent one end attached to the first head and adjacent the other end attached to the second head and configured to retain the tubes, intermediate connector and heads in assembled relationship.

14. The cylinder of claim 1 wherein the piston rod can be moved from its discrete intermediate position to its retracted position by applying a compressed gas to the second piston through the second port while allowing the third port to exhaust.

15. The cylinder of claim 14 wherein the first port is also allowed to exhaust.

16. The cylinder of claim 1 wherein the piston rod can be moved from any one of its retracted, extended or discrete intermediate positions to any other of such positions.

17. The cylinder of claim 1 which also comprises a cushion assembly with a seal encircling the piston rod and carried by the first head, a sleeve encircling the piston rod, movable in unison with the first piston and having a circumferentially continuous exterior surface portion sealingly engageable with the seal for at least part of the movement of the first piston toward its extended position to provide a chamber between the first head and the first piston and a flow rate control valve communicating this chamber and with the first port to control the flow rate of the gas from this chamber to the first port as the first piston moves toward its extended position.

18. The cylinder of claim 1 which also comprises a cushion assembly with a seal encircling and spaced from the piston rod and carried by the intermediate connector, a sleeve encircling the piston rod, movable in unison with the first piston and configured to be axially spaced from the seal when the first piston is in its extended position and having a circumferentially continuous cylindrical surface portion configured for sealing engagement with the seal during at least part of the movement of the first piston to its fully retracted position to provide a chamber between the first piston and the intermediate connector, and a flow rate control valve communicating this chamber with the second port to control the flow rate of gas from this chamber as the first piston moves towards its fully retracted position.

19. The cylinder of claim 1 which also comprises a cushion assembly with a seal encircling and spaced from the piston rod and carried by the intermediate connector, the pusher having an exterior surface encircling the piston rod, movable in unison with the second piston and configured to be axially spaced from the seal when the second piston is in its fully retracted position and configured for sealing engagement with the seal during at least part of the movement of the second piston to its intermediate position to provide a chamber between the second piston and the intermediate connector, and a flow rate control valve communicating this chamber with the second port to control the flow rate of gas from this chamber as the second piston moves towards its intermediate position.

20. The cylinder of claim 1 which also comprises a cushion assembly with an annular seal carried by the second head, a sleeve movable in unison with the second piston and configured to be axially spaced from the seal when the second piston is in either of its intermediate position or its extended position and having a circumferentially continuous cylindrical surface portion configured for sealing engagement with the seal during at least part of the movement of the second piston to its fully retracted position to provide a chamber between the second piston and the second head, and a flow rate control valve communicating this chamber with the third port to control the rate of flow of a gas from this chamber as the second piston moves towards its fully retracted position.

* * * * *